G. W. DOUGLAS.
CABLE RAILWAY.
No. 10,953. Reissued Aug. 28, 1888.
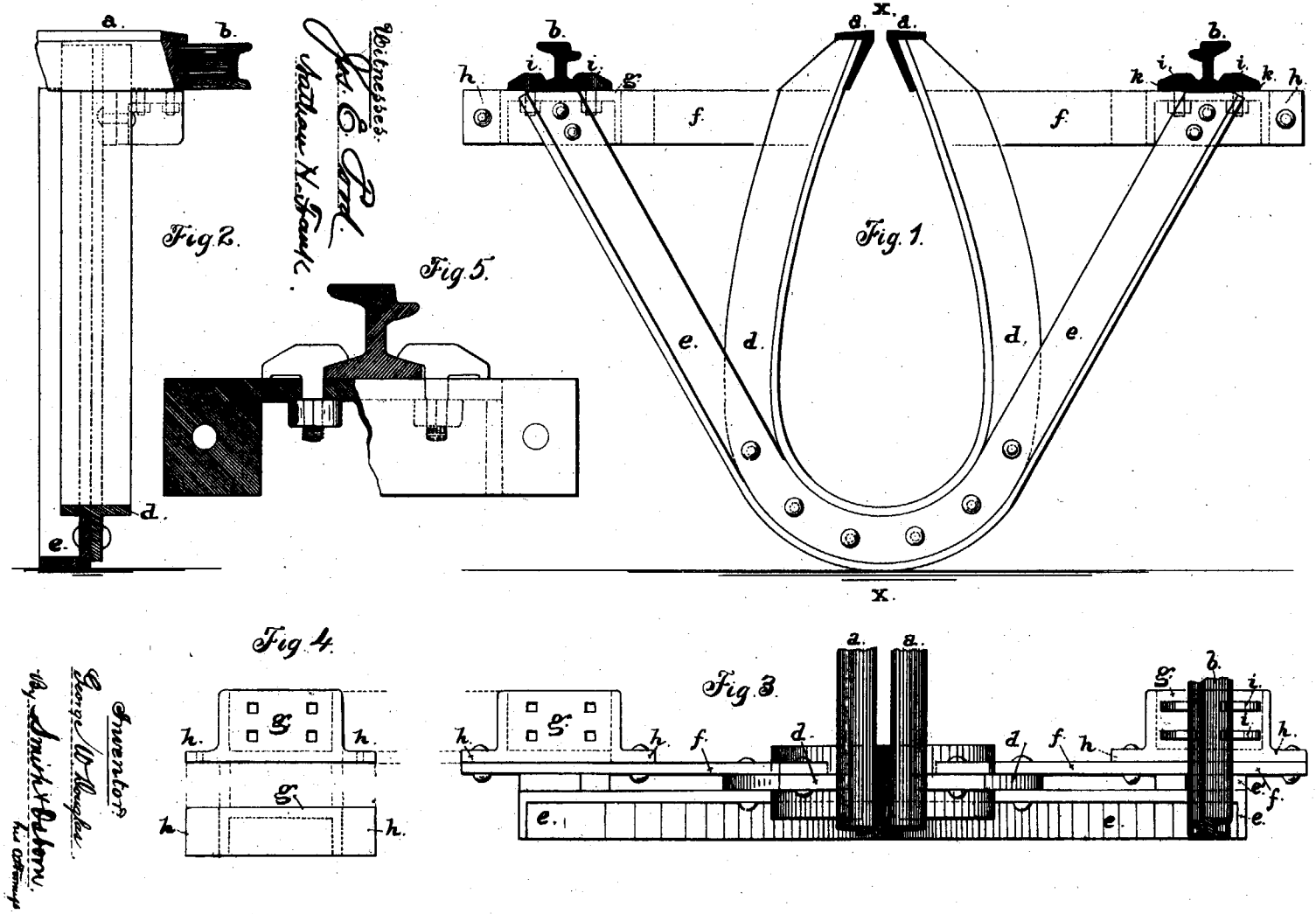
R. PETERS, Photo-Lithographer, Washington, D. C.

UNITED STATES PATENT OFFICE.

GEORGE W. DOUGLAS, OF SAN FRANCISCO, CALIFORNIA.

CABLE RAILWAY.

SPECIFICATION forming part of Reissued Letters Patent No. 10,953, dated August 28, 1888.

Original No. 367,137, dated July 26, 1887. Application for reissue filed September 7, 1887. Serial No. 249,042.

*To all whom it may concern:*

Be it known that I, GEORGE W. DOUGLAS, a citizen of the United States, residing in the city and county of San Francisco, and State of California, have invented certain new and useful Improvements in Cable Railways; and I do hereby declare that the following is a full, clear, and exact description of my said invention, reference being had to the accompanying drawings.

My invention relates to improvements in cable-railway construction; and it embraces certain improvements in skeleton frame-work for subway and track of such roads, an improvement in chairs or supports for the rails, and a novel bolt or fastening for securing the rails to the supports.

These improvements are constructed, applied, and carried out in accordance with the following description, in which the accompanying drawings are referred to by figures and letters.

Figure 1 is a vertical section through the subway and track, showing the frame-work before the cable-tube is cased in and the trench filled in. The section is taken across the track and in front of one of the transverse frames or brackets. Fig. 2 is a top view of the frame-work and rails. Fig. 3 is a vertical section taken at about the line *x x*, Fig. 1. Fig. 4 is a view of the rail chair and fastening on a larger scale. Fig. 5 is a detail view of the bolts or fastenings in place.

Similar letters of reference indicate like parts in all the figures of the drawings.

In the construction of subways and tracks of cable railways at the present time a skeleton frame-work is made of iron bars properly shaped and bolted or riveted together to form supports for the rails and the slot-irons, and to produce a skeleton tube between the rails and below the surface of the track. This frame-work is most generally formed of separate frames or brackets that are set up at intervals of space apart in the trench, and the rails and slot-irons being laid and bolted down to the supports furnished by each bracket, the filling of earth or concrete is laid in around this skeleton structure.

My improvement in such frame-work consists in constructing the same of separate frames or brackets formed of angle-iron bent to shape and bolted or riveted together, as shown in Figs. 1 and 2.

The shape of the part *d* is determined by the form and size of the cable-tube to be made, and conforms to it in cross-section. It is made by bending up a length of T-iron into a loop, with the ends standing upright and quite close together. To the bottom of the loop, against one side of its web, is bolted or riveted the part *e*, previously shaped to fit around the curved part of the loop. Its ends or straight members stand out laterally, and are carried up to suitable height to furnish supports for the rail-chairs, which are secured directly upon their tops. The outer ends of these braces *e* are joined to the sides of the loop at or near the upper ends below the slot-irons by the transverse tie-bars *f*. Angle-iron, or a bar with a single flange standing at a right angle to its web, is well adapted for the part *e* of the bracket, and in placing the two parts *d e* together the flange should be set against the web of the loop-iron, so that the other part standing out horizontally forms a wide base to the bracket to rest on the foundation on the bottom of the trench. The slot-irons *a a* are set into the opening between the upright ends of the loop, and are bolted to the flanges on the inside at every loop.

The rail-chair *g*, which is also a novel feature in this construction, consists of a flat plate with flanges *h* for bolts, to secure it to the tie-bar and part *e* of the bracket, and its face is of suitable breadth to take the meeting ends of two adjacent rails, so that it serves to support the same at each joint without requiring fish-plates, the lengths of the rails being suitably proportioned to bring the joints upon the chair at a bracket.

The flange of the chair is bolted against the outer face of the tie-bar, as is well shown in Figs. 1 and 2, and in this construction, where the faces of the two webs or flanges of the parts *d* and *e* do not set in line, it will be noticed that the thickness of one flange requires to be taken up at the chair in order to bring the tie-bar into line. This can be done by bending an offset in the tie-bar at the outer end, or, as I have shown in the drawings, by setting a plate, *e'*, of suitable thickness between the tie-bar and the face of the flange to which it is bolted. These chairs form a bed or support for the rails that cannot spread or contract, and is firm and rigid under all conditions.

To fasten the rail down to its bed or supports, I employ a bolt, *i*, of peculiar construction, with a threaded shank for a nut, and a double head or an extension on the opposite side of the hook that takes the flange, which, when the bolt is drawn down to its seat on the flange, will come to a bearing on the surface of the chair or support beyond the rail-flange. The construction of this bolt is well shown in Figs. 1, 3, and 5 of the drawings. The hook or part of the head that takes the flange has the usual form and lateral projection from the shank, and the oppositely-extending part *k* is of about the same projection, but with its bearing-surface at the outer end suitably formed by thickening the metal or by bending it down, as shown, to compensate for the thickness of the rail-flange. When such a bolt is applied and drawn down to its place against the flange of a rail, it will withstand any angular strains and forces arising from lateral pressure against the rail. By this projection on the opposite side of the head the shank is kept upright and perpendicular to the face of the rail-flange, and the nut of the bolt can be brought up flat against the bottom of the chair to a close and even bearing.

Having thus fully described my invention, what I claim as new, and desire to secure by Letters Patent, is—

1. The transverse frame or section for cable railways, consisting of a loop formed of T-iron bent into the shape of the tube or tunnel with the horizontal flange inwardly, in combination with the yoke of angle-iron bent to fit the lower curve of the loop, having its vertical flange bolted to the vertical flange of the loop around the curve, and its ends extending upwardly to a point beneath the rails and connected with the upper ends of the loop by transverse tie-bars bolted to both, substantially as herein described.

2. The improved track and slot-iron supporting frame for cable railways, consisting of a loop formed of T-iron and an exterior yoke of angle iron, the two being bent into the same curve at the lower part and bolted together around the curve, so as to present a base comprising the two horizontal flanges, the upper ends of the yoke and loop diverging, so as to support the track and slot rails, respectively, in combination with the uniting bars or braces, substantially as herein described.

3. The improvement in cable railways, consisting of the transverse slot-irons and track-supporting frames formed of T-iron and angle-iron, as shown, in combination with the rail-supporting chairs bolted to the frames, and having the double-headed bolts constructed to rest upon the flanges of the rail and the top of the chair, substantially as herein described.

4. The herein-described bolt or fastening for holding down a rail to its chair or support, consisting of a body having a threaded shank for a nut, a hook or projecting head for the rail-flange, and an offset or lateral extension opposite to the hook or head, substantially as herein set forth.

In testimony whereof I have affixed my signature in presence of two witnesses.

GEORGE W. DOUGLAS.

Witnesses:

CHAS. E. KELLY,

C. W. M. SMITH.